(12) United States Patent
Lin

(10) Patent No.: US 8,195,343 B2
(45) Date of Patent: Jun. 5, 2012

(54) 4D GIS VIRTUAL REALITY FOR CONTROLLING, MONITORING AND PREDICTION OF MANNED/UNMANNED SYSTEM

(76) Inventor: Ching-Fang Lin, Simi Valley, CA (US)

( * ) Notice: Subject to any disclaimer, the term of this patent is extended or adjusted under 35 U.S.C. 154(b) by 691 days.

(21) Appl. No.: 12/154,033

(22) Filed: May 19, 2008

(65) Prior Publication Data

US 2009/0073034 A1    Mar. 19, 2009

Related U.S. Application Data

(60) Provisional application No. 60/931,048, filed on May 19, 2007.

(51) Int. Cl.
*G05D 1/02* (2006.01)
*G01S 19/38* (2010.01)

(52) U.S. Cl. ............ 701/2; 701/472; 701/482; 701/522; 701/526; 340/539.13

(58) Field of Classification Search .................. None
See application file for complete search history.

(56) References Cited

U.S. PATENT DOCUMENTS

| | | | | |
|---|---|---|---|---|
| 6,658,325 | B2 * | 12/2003 | Zweig | 700/245 |
| 6,687,571 | B1 * | 2/2004 | Byrne et al. | 700/245 |
| 7,143,130 | B2 * | 11/2006 | Lin | 709/203 |
| 7,236,861 | B2 * | 6/2007 | Paradis et al. | 701/24 |
| 7,376,511 | B2 * | 5/2008 | Szabo et al. | 701/210 |
| 2008/0009969 | A1 * | 1/2008 | Bruemmer et al. | 700/245 |

* cited by examiner

*Primary Examiner* — Michael J. Zanelli
(74) *Attorney, Agent, or Firm* — Raymond Y. Chan; David and Raymond Patent Firm

(57) ABSTRACT

A method and system for multi-tracking among independent individuals without a monitoring center, where an individual is a person, a vehicle, or any other property, enables the individuals to be networked in a group and each individual to search and track other individuals of interest. The portable multi-tracking system is also capable of tracking personnel inside a building, where a self-contained positioning device provides continuous carrier's position information. In the open area a GPS (Global Positioning System) unit is activated to provide precision absolute position data which can be blended with the self-contained data to improve the accuracy and robustness of the positioning services. Thus the present invention provides excellent position tracking outside a building.

20 Claims, 15 Drawing Sheets

4D GIS VIRTUAL REALITY FOR CONTROLLING, MONITORING AND PREDICTION OF MANNED/UNMANNED SYSTEM

CROSS REFERENCE OF RELATED APPLICATION

This is a non-provisional application of a provision application having an application number of 60/931,048 and a filing date of May 19, 2007.

BACKGROUND OF THE PRESENT INVENTION

1. Field of Invention

The present invention relates to remote tracking processing, and more particularly to a method and system for multi-positioning-and-tracking, voice and video communication via the Internet. Each multi-tracking device can obtain the location information of each individual in a group and track him in real time. Each multi-tracking device can communicate one another in voice. Equipped with a mini-camera the video can be transferred forth and back among those people equipped with the tracking device.

2. Description of Related Arts

There is a demand for determining another person's or vehicle's location anywhere and anytime. The current technology utilizes a monitoring center equipped with computers and communication links. The persons or vehicles tracked send their position data via the communication link to the monitoring center. The monitoring center is capable of displaying their current locations on a display unit in real time. The monitoring center can also perform command and control tasks to dispatch personnel or vehicles under tracking. A typical such application is the fleet tracking system. This tracking system also has the capability to recover the stolen or lost vehicle or hijacked personnel.

SUMMARY OF THE PRESENT INVENTION

A main objective of a portable multi-tracking method and system of the present invention is to acquire the current locations of individuals of interest. These individuals' locations are displayed with a map as background on the acquirer's display unit. The invention allows any person or vehicle with a display unit to display their position and the relative positions of any other persons or vehicles of interest.

It is a further objective of the present invention to provide a portable multi-tracking method and system, in which the position data from the positioning module is shared with other individuals via a public network, such as the Internet.

It is a further objective of the present invention to provide a portable multi-tracking method and system, in which a self-contained miniature IMU (inertial measurement unit) is used along with a GPS (global positioning system) receiver to deliver uninterrupted positioning data for each individual.

It is a further objective of the portable multi-tracking method and system of the present invention for multi-tracking among independent individuals without a monitoring center, where an individual is a person, a vehicle, or any other property. With this system, the individuals are networked in a group, and each individual can search and track other individuals of interest. Equipped with a powerful self-contained micro IMU (Inertial Measurement Unit), this system is capable of tracking personnel inside a building, where the micro IMU provides continuous carrier's position information. In the open area a GPS (Global Positioning System) unit is activated to provide precision absolute position data which can be blended with the IMU data to improve the accuracy and robustness of the positioning services. Thus the present invention provides excellent position tracking outside a building.

It is a further objective of the portable multi-tracking method and system of the present invention to provide individuals' locations which are overlaid on a digital map on the host's display unit. The host is at the center of the display, thus the relative locations of other individuals are displayed on the host's display unit. The networked individual can send messages to each other as well.

It is a further objective of the present invention is to provide the portable multi-tracking method and system, which can be applied for tracking of family members, tracking of cab vehicles of a taxi company, and tracking of law enforcement officials pursuing criminals or suspects. In a military environment, the soldiers in a regiment can track each other during military missions by using the present invention. The pilots of aircraft in a formation can use the multi-tracking system to maintain formation flight and evade potential collision.

These and other objectives, features, and advantages of the present invention will become apparent from the following detailed description, the accompanying drawings, and the appended claims.

DETAILED DESCRIPTION OF THE PREFERRED EMBODIMENT

Figure 1:
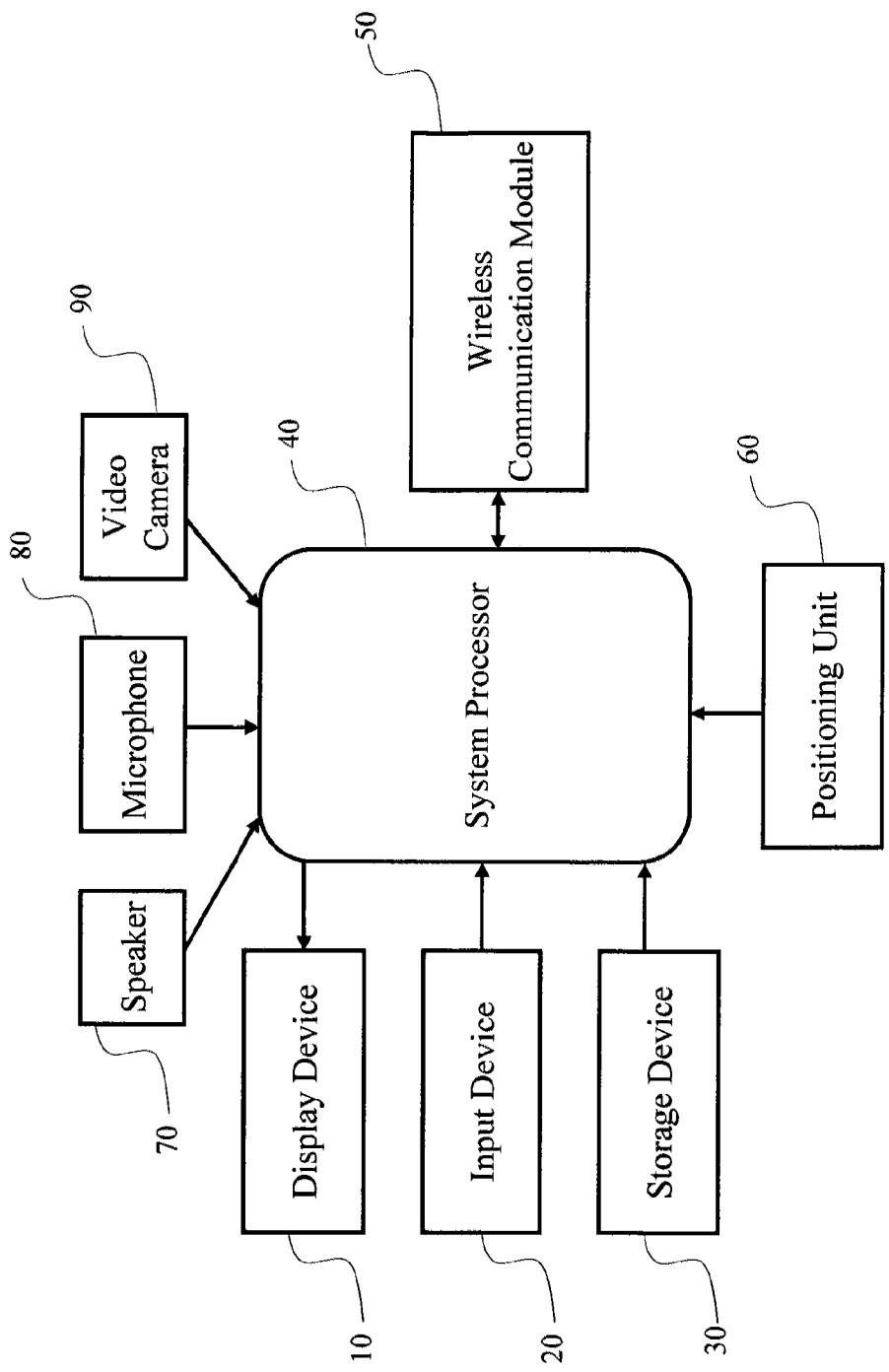
FIG. 1 shows a unit for a portable multi-tracking system according to a preferred embodiment of the present invention, where a positioning unit generates position data of the carrier and a wireless communication module is responsible for networked position data exchange.

Referring to FIGS. 1 to 12, a portable multi-tracking method and system according to a preferred embodiment of the present invention is illustrated, which is provided for multi-tracking processing by using a public network such as the Internet, where the Internet is responsible for location and command data exchanging between individuals among a group. The individual is a person, a vehicle, or any other property. With this system, the individuals are networked in a group, and each individual can search and track other individuals of interest. The present invention also is equipped with a powerful self-contained micro IMU (Inertial Measurement Unit), which is capable of tracking personnel inside a building, where the micro IMU provides continuous carrier's position information. In the open area a GPS (Global Positioning System) unit is activated to provide precision absolute position data which can be blended with the self-contained micro IMU data to improve the accuracy and robustness of the positioning services. Thus the present invention provides excellent position tracking outside a building.

The IMU/GPS integrated device, in general, is costly and big in size. Weight, and large size lead to a not feasible deployment in a car or for being carried by a single individual. With the emergence of the MEMS (MicroElectronicMechanical System) technology, a miniature IMU based on MEMS technology becomes an embracible reality.

The micro IMU to be embodied in the preferred embodiment of the present invention is invented by the applicants, referring to U.S. patents pending, "MicroElectroMechanical System for Measuring Angular Rate", Ser. No. 60/154,700; "Processing Method for Motion Measurement", Ser. No. 09/399,980; "Angular Rate Producer with MicroElectroMechanical System Technology", Ser. No. 09/442,596; and "Micro Inertial Measurement Unit", Ser. No. 09/477,151. Besides, the applicants also invented a "coremicro" IMU to be capable of employed in the present invention, which is currently "The world's smallest" IMU, which is based on the combination of solid state MicroElectroMechanical Systems (MEMS) inertial sensors and Application Specific Integrated Circuits (ASIC) implementation. The "coremicro" IMU is a fully self contained motion-sensing unit. It provides angle increments, velocity increments, a time base (sync) in three axes and is capable of withstanding high vibration and acceleration. The "coremicro" IMU is opening versatile commercial applications, in which conventional IMUs can not be applicable, including land navigation, automobile navigation, personal hand held navigators, robotics, marine vehicles and unmanned air vehicles, various communication, instrumentation, guidance, navigation, and control applications.

The portable multi-tracking method according to the preferred embodiment of the present invention includes the following steps:

(1) Provide a plurality of portable multi-tracking units, wherein one of the portable multi-tracking units acts as a host unit while the other portable multi-tracking units act as client units.

(2) Provide host position data of the host unit from a positioning unit, wherein the positioning unit can be a GPS receiver, an IMU positioning device, or an integrated GPS/IMU device. The position data is a three dimensional vector of (x, y, z) coordinates in the Earth-Centered-Earth-Fixed (ECEF) coordinate system, or of (latitude, longitude, altitude) coordinates in the Geodetic coordinate system.

(3) Receive client position data and client identification of the client units by a wireless communication module through a wireless communication public network, such as the Internet, where the wireless communication module creates and maintains a communication link with other individuals. The data received from the wireless communication module include other individuals' position data, their identifications (IDs), inquiring commands, and other messages.

(4) Send the host position data and a host identification of the host unit by the wireless communication module through the wireless communication public network so that other individuals can access these data.

According to the preferred embodiment of the present invention, the step (1) further comprises the following steps:

(1.1) Retrieve map data from a map database stored in a storage device of each of the portable multi-tracking units to provide a map.

(1.2) Display the map on a displaying unit of each of the portable multi-tracking units.

Also, the step (2) further comprises the steps of processing the host position data to achieve the host location and displaying the host location of the host unit on the map on the displaying unit of the host unit.

The step (3) further comprises the steps of decoding the client locations received from the client units to achieve the client locations thereof and displaying the client locations of the client units on the map on the displaying unit of the host unit.

The step (4) further comprises the steps of decoding the host location received from the host unit to achieve the host location by each of the client unit, and displaying the host location of the host unit on the map on the displaying unit of each of the client units.

Moreover, the step (1) further comprises a step of receiving user commands from an input device, wherein the input device can be a keyboard, a touch screen, a pen coupled with a character recognition system, or a voice recognition device. The user commands include: viewing a map, displaying other individuals' locations relative to the host, sending messages, scheduling trip, activating autonomous navigation functionality, and locating an address.

The portable multi-tracking method of the present invention further includes the steps of:

(a) collecting voice data from a microphone;

(b) encoding the voice data by the system processor;

(c) sending the encoded voice data to the wireless communication module so that other multi-tracking device can access the voice data;

(d) receiving encoded voice data from the wireless communication module;

(e) decoding the voice data by the system processor; and (f) sending the decoded voice data to a speaker so that the user can hear what other people are talking.

Alternatively, the portable multi-tracking method of the present invention may further include the steps of:

(a') collecting video image from a video camera;

(b') encoding the video image by the system processor;

(c') sending the encoded video image to the wireless communication module so that other multi-tracking device can access the image data;

(d') receiving encoded video image from the wireless communication module;

(e') decoding the video image by the system processor; and (f') sending the decoded video image to the display so that the user can watch what other people are doing.

Each individual has a user ID which can be an identification code or name of the user. All the user IDs of the individuals who log on the server are listed. Each user of the portable multi-tracking system can select a specific individual by choosing his/her ID on the list to view his/her location. Each user of the portable multi-tracking system can also select multiple individuals by choosing their user IDs on the list to view their location.

The portable multi-tracking system provides an option for the user to disable or enable the accessibility. When the accessibility is enabled, other individuals can access his/her location information. When the accessibility is disabled, other individuals can not access his/her location information.

Individuals are grouped into different user groups. Each user group has a group identification number or name. One of the individuals in a user group is selected as a group server of that user group to receive the locations from individuals in that user group and then broadcasts the locations to the individuals in the same user group so that the individuals know their locations with each other. An individual can access another individual in the same user group but cannot access individuals in a different user group.

The portable multi-tracking system provides an option for the user to select user group of interest. It also provides an option for the user to create a user group so that other individuals can enter into this group.

According to the present invention, as shown in FIG. 1, the portable multi-tracking system comprises a display device 10, an input device 20 (such as a keyboard, or a touch screen), a storage device 30 (such as a CD-ROM, a hard drive, or a flash memory embedded in the computing platform), a system processor 40 (such as a palm PC, a laptop computer, or a specific computing platform), a positioning unit 60, a wireless communication module 50, a speaker 70, a microphone 80, and a video camera 90.

The display device 10 is connected to the system processor 40. The system processor 40 outputs the map data to the display device 10. The display device 10 is responsible for displaying the map to the user. The map data is retrieved by the system processor 40 from the storage device 30 which is connected to the system processor 40. The map data is stored in the storage device 30 in a specific format and is called electronic map database. The electronic map database provides digital data of the streets, buildings, rivers, mountains, and other terrain information.

The system processor 40 also outputs other individuals' position data to the display device 10, where other individuals' position data is retrieved from the wireless communication module 50. Other individuals' locations are overlaid on the electronic map so that the user knows where other individuals are and their relative position profile.

The input device 20 is connected to the system processor 40 and acts as an interface for the user to intervene in the system operation. The input device 20 can be a regular or modified keyboard which can receive character inputs from the user. The input device 20 can also be a software keyboard coupled with a character recognition system so that the user can use a stylus to input characters. The input device 20 can also be a touch screen coupled with corresponding software to identify the commands sent from the user. The input device 20 can also be a microphone coupled with a voice recognition system to receive commands from the user.

The storage device 30 is connected to the system processor 40 and used for storing electronic map database, and/or other interim data such as the location and IDs of other individuals from the wireless communication module 50. The storage device 30 can be a CD, a hard drive, or a flash memory.

The system processor 40 is a central processing unit coupled with necessary interfaces to the display device 10, the input device 20, the storage device 30, the positioning unit 60, and the wireless communication module 50. The system processor 40 is responsible for processing sensor positioning data, display processing, input response, remote data or command processing, sending messages, and device control and management.

The wireless communication module 50 is connected to the system processor 40. The wireless communication module 50 is used to process wireless communication protocol, wireless signal detection, received data conversion, signal data amplification, modulating a digital signal to be transmitted into an analogue signal, and demodulating an analogue signal into a digital signal. The wireless communication module 50 further comprises an antenna for converting an analogue signal into a radiative signal or converting a detected radiative signal from a remote device (such as another portable multi-tracking system) into an analogue signal which is suitable for the wireless communication module to process.

The positioning unit 60 is connected to the system processor 40 and generates the current position data of the host. The position data comprises of position, velocity, and heading. The positioning unit 60 can be a GPS receiver, an IMU, or the combination of a GPS receiver and an IMU. In the open area the GPS receiver is a good candidate for generating position data. The IMU is preferred to be the micro IMU or "coremicro" IMU and can be used in a building to provide robust position data for the carrier.

The positioning unit 60 can be a MEMS (MicroElectronicMechanicalSystem) inertial sensor which generates position data. The MEMS techniques offer tremendous cost, size, reliability, power consumption improvements for guidance, navigation, and control systems, compared with conventional inertial sensors.

The positioning unit 60 can be a land or water vehicle navigator which generates position data. The applicant invented a land and water navigator, U.S. patent application No. 60/167,830, "Vehicle Self-Carried Positioning Method and System Thereof", which is used to determine position information on land and in water with high accuracy. The land and water navigator invention has evolved from the "coremicro" IMU patent pending. The navigator can receive but not rely on the GPS signal and DGPS signals for highly accurate positioning solution. Without GPS/DGPS signals, the land and water navigator also provides a highly accurate positioning solution, such as an accuracy of better than 1 percent of the distance traveled. The land and water navigator is a right positioning system with reasonable size and weight and power consumption for commercial vehicle operation, which can be used in areas where GPS signals are not available, such as tunnels, forested areas, urbanized terrain, and high Electronic Counter Measure (ECM) environments.

The positioning unit 60 can also be a hand-held navigator which generates position data. The applicants also invent a hand-held navigator, U.S. Pat. No. 6,415,223, "Self-Contained Positioning Method and System Thereof for Hand-Held Navigator", having reasonable size and weight and power consumption for hand-held operation to determine position for a user on land with high accuracy. The hand-held navigator invention has evolved from the "coremicro" IMU patent pending. The navigator can receive but not rely on the GPS signal and DGPS signals for highly accurate positioning solution. Without GPS/DGPS signals, the hand-held navigator also provides highly accurate positioning solution, such as an accuracy of better than 1 percent of the distance traveled. The hand-held navigator is the right positioning system with reasonable size and weight and power consumption for commercial applications, which can be used in areas where GPS signals are not available, such as tunnels, forested areas, urbanized terrain, and high Electronic Counter Measure (ECM) environments.

The microphone 80 is connected to the system processor 40. The microphone 80 detects sound and converts the sound wave to electrical signal. The electrical presentation of the sound is further sampled and converted into digital data. The digital data is processed by the system processor 40 to compensate noise and reduce data size. Then the digital data is encoded. The encoded digital sound data is sent to the wireless communication module 50. The wireless communication module 50 sends the encoded sound data to the network via Internet so that other individuals can access it.

The speaker 70 is connected to the system processor 40. The wireless communication module 50 receives encoded digital sound data via Internet and send it to the system processor 40. The system processor decodes the digital sound data and sends it to the speaker 70. The speaker 70 converts the digital sound data to analogue signal and then the analogue signal is converted to sound wave.

The video camera 90 is connected to the system processor 40. The video camera captures the video image can convert it to digital presentation. The digital presentation of the video image is sent to the system processor 40. The digital video image data is processed and encoded, and finally sent to the wireless communication module 50. The wireless communication module 50 sends the encoded video image to the network via Internet so that other individuals can access.

The wireless communication module 50 receives encoded digital video image via Internet and send it to the system processor 40. The system processor 40 decodes the digital video image data and sends it to the display device 10.

Figure 2:
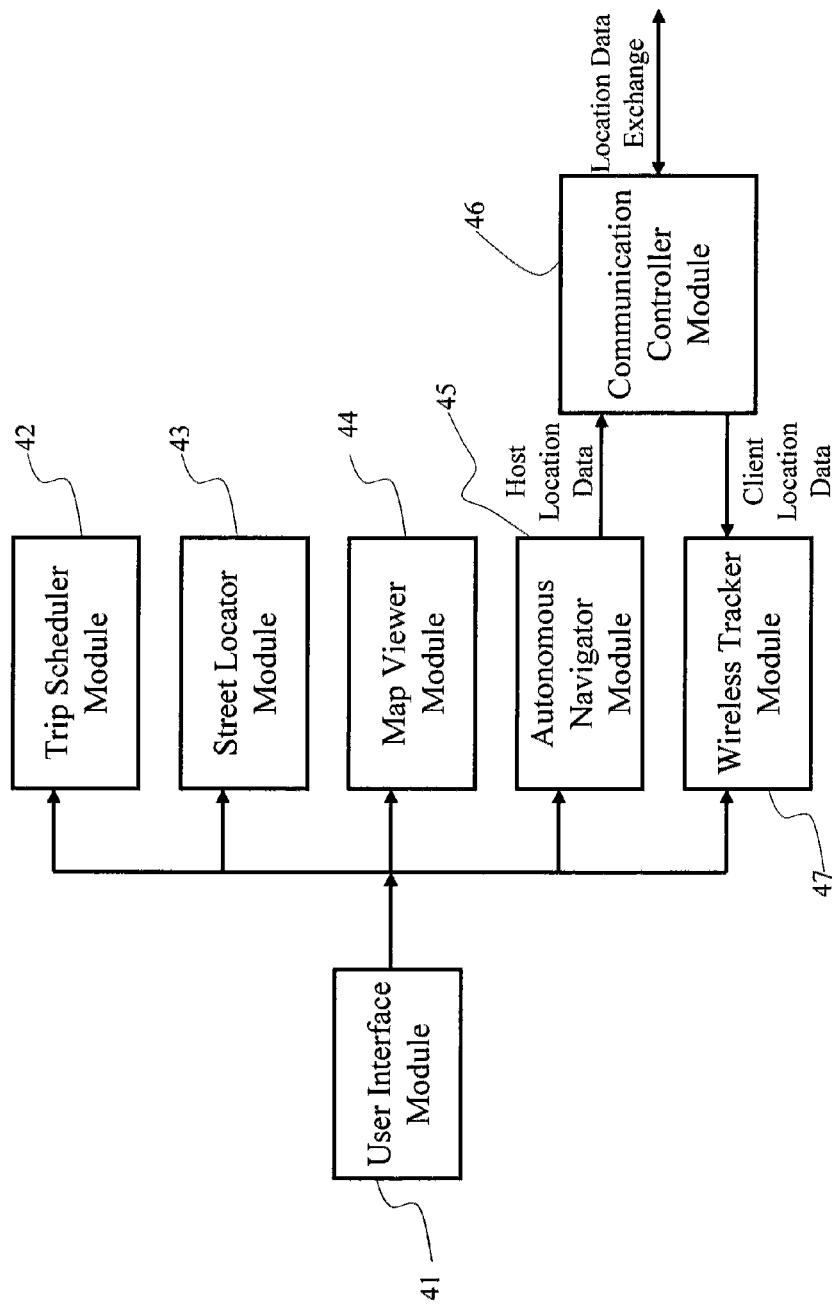
FIG. 2 is a block diagram illustrating the software system of the portable multi-tracking system according to the above preferred embodiment of the present invention, wherein a user interface module oversees each functional module.

The software system supporting the portable multi-tracking functionality comprises a user interface module 41, a trip scheduler module 42, a street locator module 43, a map viewer module 44, an autonomous navigator module 45, a wireless tracker module 46, and a communication controller module 47, as shown in FIG. 2. The user interface module 41 is an entry for the user to enable or disable the functions of wireless communication, multi-tracking, autonomous navigation, displaying map, locating an address, and scheduling a trip.

The user interface 41 provides an entry for user to select operation functions among position tracking, voice tracking, and video tracking. The voice tracking captures the host's message in voice fashion and sends it to the network via Internet. The voice tracking also receives voice data from Internet and speak it out the user. The video tracking captures the video image about the user and his surrounding environment and send it to the network via Internet. The video tracking also receives video data from Internet and displays it on the display device 10.

The trip scheduler module 42 plans and schedules the trip, including defining start point, interim points, and end point. Other information can also be logged, such as visiting time, appointments, contact persons, and comments.

The map viewer module 44 displays the map data on the display device 10. The map viewer can zoom in and out the area of interest with great accuracy, displays the position data (speed, direction, longitude, latitude, and height) of the host and other individuals in the network.

The street locator 43 searches a place or destination by address, name, position data, or a click on the map.

The autonomous navigator module 45 tracks and navigates wherever the user goes, shows the real-time speed and direction, illustrates no-map areas such as mountains, lakes, and rivers, gives a warning message if the user goes the wrong way, allows two-points or multi-point routing, provides street-to-street directions, shows time and distance to destination, and programs avoidable areas.

The autonomous navigator module 45 outputs the position data of the host to the communication controller module 47. The communication controller module 47 combines the host position data with the host's ID and sends them to the wireless communication module 50. The wireless communication module 50 is a combination of hardware and software and is responsible to send these data onto the network so that other individuals can access these data. The data stream sent from the host has an order as follows (in words):

(1) Time Tag in milliseconds: 1 word.

(2) ID: 1 word, when necessary it can be extended into 2 words to encompass more mobile users.

(3) Three dimensional location in Geodetic coordinate system, including Latitude in radians, Longitude in radians, height above sea level in meters. Each location component occupies 1 word.

(4) Three dimensional location in an earth-centered inertial coordinate system (ECIZ). Each location component occupies 1 word.

(5) Three dimensional velocity in an earth-centered inertial coordinate system (ECIZ). Each velocity component occupies 1 word.

The above motion parameters are sufficient for characterizing a ground vehicle to realize multi-tracking. When used for aircraft tracking, the message will be enhanced by adding the following information:

(6) Three dimensional acceleration in an earth-centered inertial coordinate system (ECIZ). Each acceleration component occupies 1 word.

(7) Rotation matrix from the earth-centered inertial coordinate system to the body coordinate system (BC).

(8) Three dimensional angular velocity in radians/second when the observer is in an earth-centered inertial coordinate system and the resolution is in the body coordinate system.

(9) Three dimensional angular acceleration in radians/second$^2$ when the observer is in the earth-centered inertial coordinate system and the resolution is in the body coordinate system.

The communication controller module 47 also receives information from other individuals in a group and sends such information to the wireless tracker module 46. The wireless tracker module retrieves the individual ID and its position data and sends these data to the map viewer module 44. The map viewer module can display other individuals' locations on the electronic map. The wireless tracker module updates the tracking status of other individuals of interest at a constant period. It also alerts the user when losing track of a specific individual of interest. It also alerts for potential collision between the host and other individuals in the aircraft applications.

Figure 3:
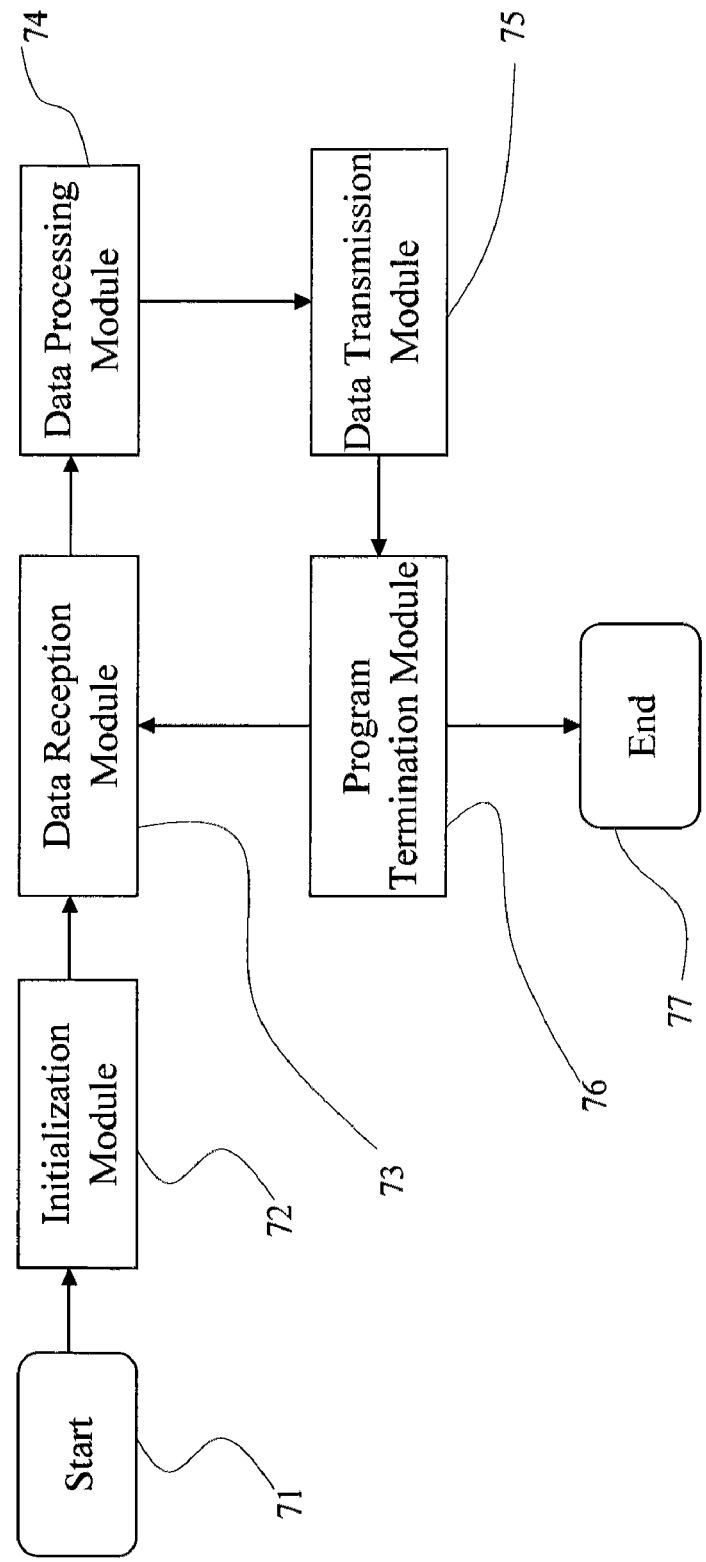
FIG. 3 is a block diagram illustrating the operation flow of the portable multi-tracking system according to the above preferred embodiment of the present invention.

As shown in FIG. 3, the multi-tracking mechanism in accordance with the present invention. It consists of a start module 71, an initialization module 72, a data reception module 73, a data processing module 74, a data transmission module 75, a program termination module 76, and an end module 77.

Figure 4:
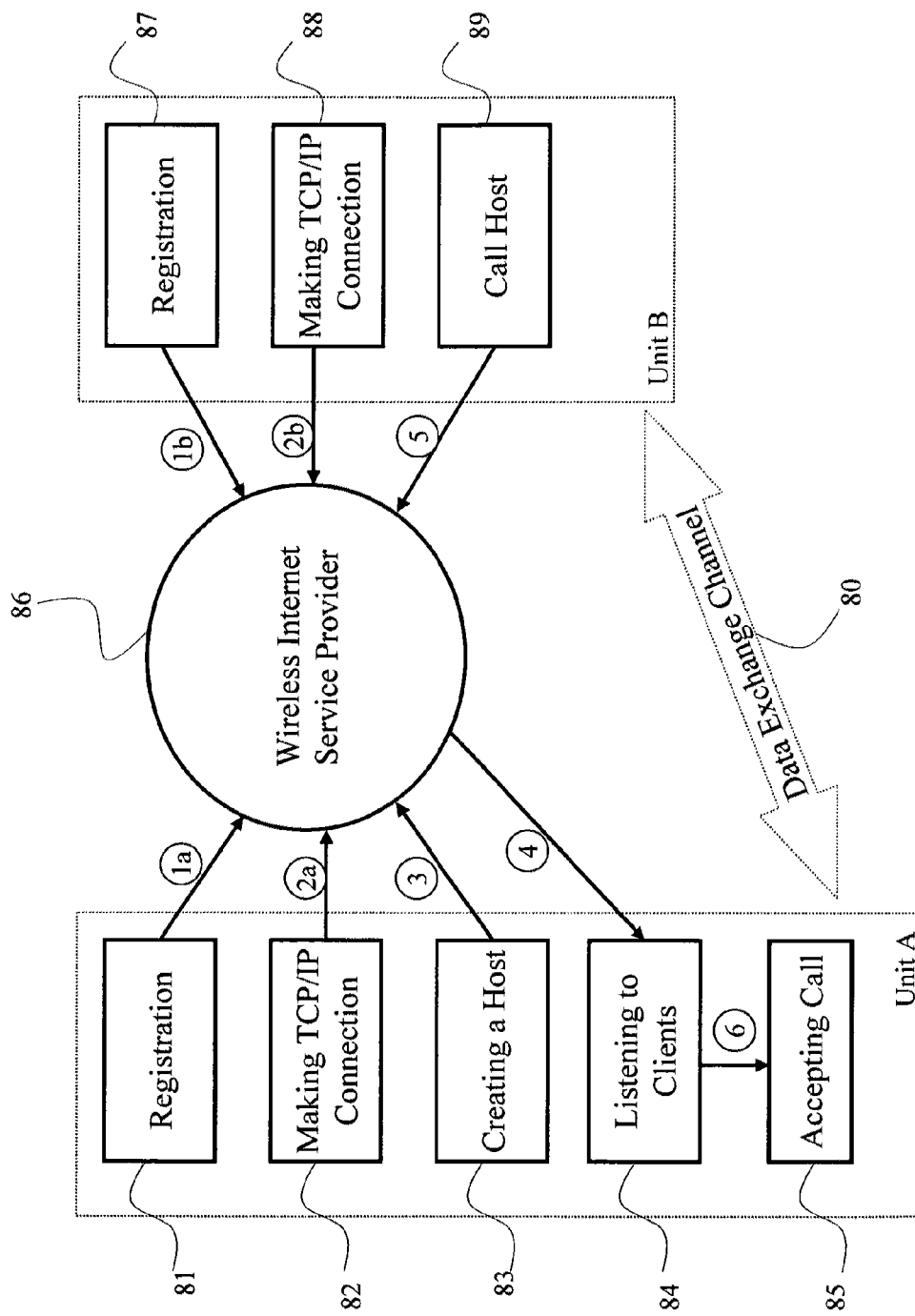
FIG. 4 is a block diagram illustrating the procedure for creating a data exchange channel between the server and client based on the Internet protocol according to the above preferred embodiment of the present invention.

As shown in FIG. 4, the mechanism for the creation of a communication link between individuals, where two individuals are illustrated. The starter for creating the communication link acts as a Server, which is marked as Unit A in FIG. 4. The responders act as Clients, which are marked as Unit B in FIG. 4. The communication is based on the TCP/IP technology.

The networking technologies have been advanced since the inventions of Ethernet, Token Ring, Fiber Distributed Data Interfaces (FDDI), X.25, Frame Relay, Switched Multimegabit Data Service (SMDS), Integrated Services Digital Network (ISDN), and Asynchronous Transfer Mode (ATM). The Internet protocols are the most popular technology for networking diverse vendor protocols.

The communication link of the present invention is built on the TCP/IP technology to realize portability and cost-effectiveness. The TCP (transmission control protocol) is a connection-oriented transport protocol that sends data as unstructured stream of bytes. In the TCP/IP architecture, the IP (Internet Protocol) is responsible for transferring packets of data from point to point, where each point is a communication link node. The TCP is responsible for verifying the correct delivery of data among points. The TCP can detect errors and specify retransmission until the data is correctly and completely received.

The wireless IP modems are candidates for creating the communication link between the portable multi-tracking systems. Each multi-tracking unit carries one IP modem with a unique IP address. Based on the unique IP address the multi-tracking unit in a group can recognize each other.

FIG. 4 shows the process for creating the data exchange channel between the server (Unit A) and client (Unit B). Both the server and client have to register with the wireless Internet service provider 86. Each one will be assigned an IP address, which is a unique ID for each device. An example for IP address is 166.129.081.165. Each one will also be notified by a primary DNS server IP address or a secondary DNS server IP address for dialing-up to the wireless Internet service provider. An example for a primary DNS server IP address is 206.138.237.235, and an example for a secondary DNS server IP address is 206.138.237.234.

According to the present invention, a process of creating a data exchange channel or link between the server and client includes the steps of:

(1a) registering the Unit A with the wireless Internet service provider, where the wireless Internet service provider must support the hardware and software protocol employed in the Unit A;

(1b) registering the Unit B with the wireless internet service provider, where the wireless internet service provider must support the hardware and software protocol employed in the Unit B, wherein the implementation of hardware and software in Unit B does not have to be the same as that in Unit A;

(2a) making TCP/IP connection between the Unit A and the wireless internet service provider, wherein a dial-up network software can be used to perform such an operation and the Unit A obtains a data transferring channel by making a TCP/IP connection with the wireless internet service provider;

(2b) making a TCP/IP connection between the Unit B and the wireless Internet service provider, wherein a dial-up network software can be used to perform such an operation. Unit B obtains a data transferring channel by making the TCP/IP connection with the wireless Internet service provider;

(3) creating a host on the Unit A, wherein the host is a central communication node through which position information can be exchanged among multiple clients;

(4) listening to clients by the host on the Unit A, wherein the host listens to requirements for logging on the network from clients;

(5) calling host by the Unit B, wherein the client sends requirements for logging on the communication network; and (6) accepting call by the host on the Unit A to build the data exchange channel between the Unit A and the Unit B, where the Unit A acts as a Server and the Unit B as a Client.

The above steps (1a), (1b), (2a), and (2b) can be randomly changed but conforming to the following rules:

Rule 1: Step (1a) must be executed before step (2a).
Rule 2: Step (2a) must be executed before step (3).
Rule 3: Step (1b) must be executed before step (2b).
Rule 4: Step (2b) must be executed before step (5).

Figure 5:
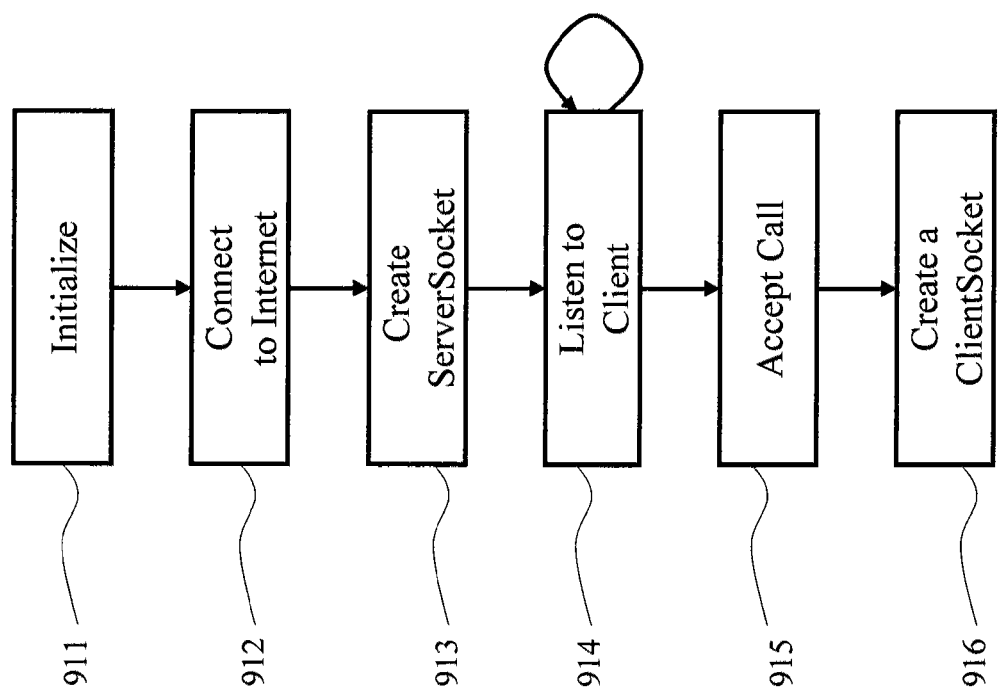
FIG. 5 is a block diagram illustrating the procedure on the server end by using socket according to the above preferred embodiment of the present invention.
Figure 6:
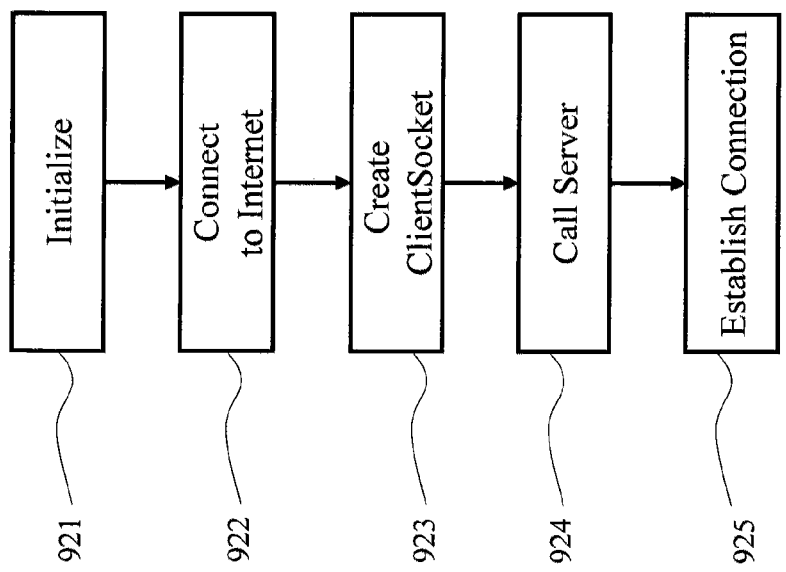
FIG. 6 is a block diagram illustrating the procedure on the client end by using socket according to the above preferred embodiment of the present invention.

As shown in FIG. 5, in order to create the communication link by using a socket, the server performs the following steps:

First, initialize system parameters and associated registers, which is indicated by 911.

Second, the server connects to the Internet. This can be done by using dial-up software. This dial-up software dials up the Internet service provider, and keeps a communication channel with the Internet service provider.

Third, after connecting to the Internet service provider, the server creates a ServerSocket which is a subroutine provided by the computer operating system.

Fourth, the server listens to calls from clients. When the server detects a call from a client, the server accepts the call, and creates another socket called ClientSocket which is used to communicate with the client.

On the other hand, when the client tries to contact the server, first, the client initializes the system parameters and associated registers;

second, does the same thing as the server does: dials up the Internet service provider, and keeps a communication channel with the Internet service provider;

third, after connecting to the Internet service provider, the client creates a ClientSocket which is a subroutine provided by the computer operating system; and fourth, the client calls the server at the server's IP (Internet Protocol) address, wherein when the server accepts the call, a wireless communication link is established between the server and the client.

When the server is communicating with clients, it is still listening so that it can accept multiple calls from multiple clients. When the server receives calls from different clients, it creates different ClientSockets to handle the communication task with different clients. This methodology makes it a right solution for networked multi-tracking processing.

Each client sends its location and ID to the server, and the server broadcasts this information to the group to realize the multi-tracking among a group.

Figure 7:
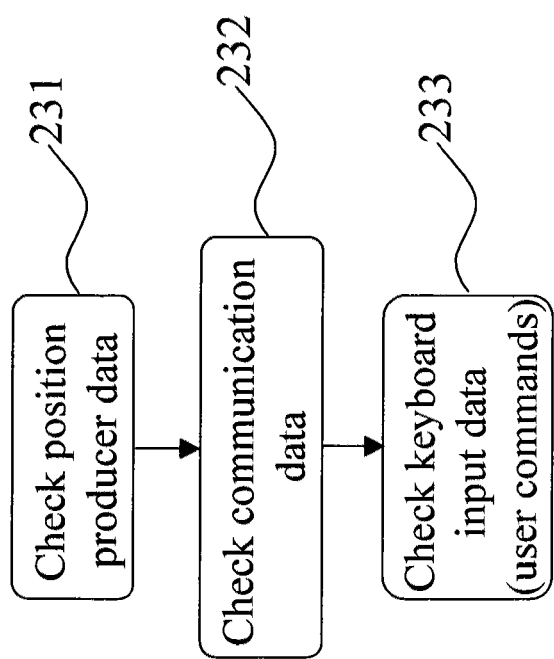
FIG. 7 is a block diagram illustrating the process engine for the data reception module according to the above preferred embodiment of the present invention.

FIG. 7 illustrates a process engine for the data reception module 73, as shown in FIG. 3, which comprises three functional modules: namely a position producer data reception module 231, a communication data (or remote data) reception module 232, and a user input data reception module 233. All three modules are executed in a synchronous fashion, and communicate with each other.

Figure 8:
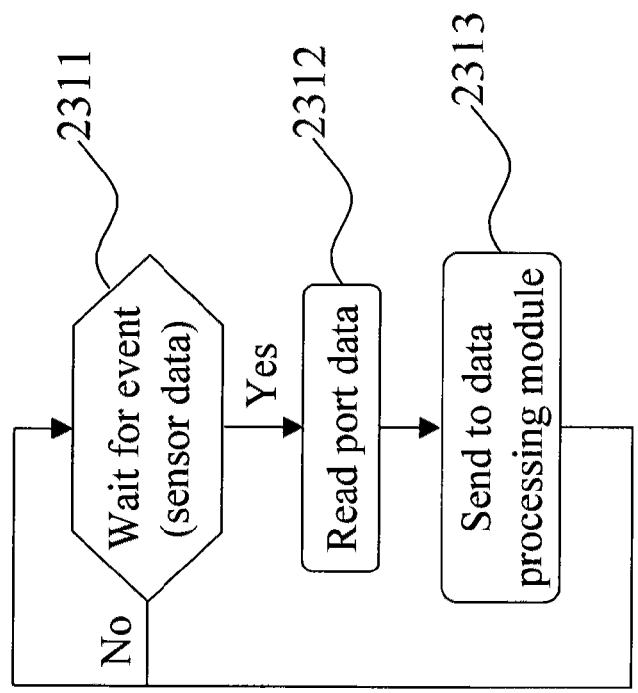
FIG. 8 is a block diagram that further extends the process of the position producer data reception module according to the above preferred embodiment of the present invention.

As shown in FIG. 8, the position producer data reception module 231, as shown in FIG. 7, further comprises three functional modules: a synchronous module 2311, a port data reading module 2312, and a communication module 2313. The synchronous module 2311 is designed to wait for an event that shows that new position data is ready without wasting the system processing time.

Figure 9:
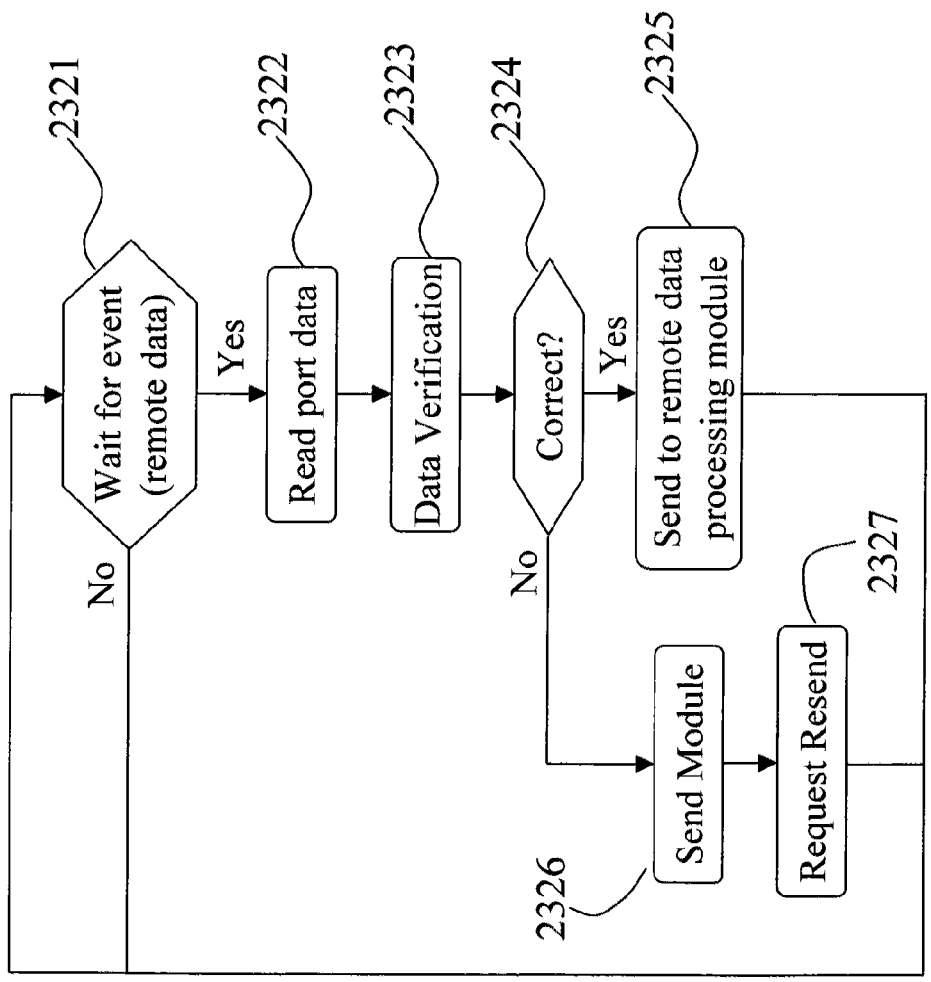
FIG. 9 is a block diagram that further extends the process of the communication data (or remote data) reception module according to the above preferred embodiment of the present invention.

As shown in FIG. 9, the communication data (or remote data) reception module 232, as shown in FIG. 7, further comprises a synchronous event module 2321, a communication port data reading module 2322, a data verification module 2323, an error checking and recovering module 2324, a data transfer module 2325, a send module 2326, and a request module 2327 with a remote device. The data transfer module 2325 is a type of synchronous module that communicates with a remote data processing module.

Figure 10:
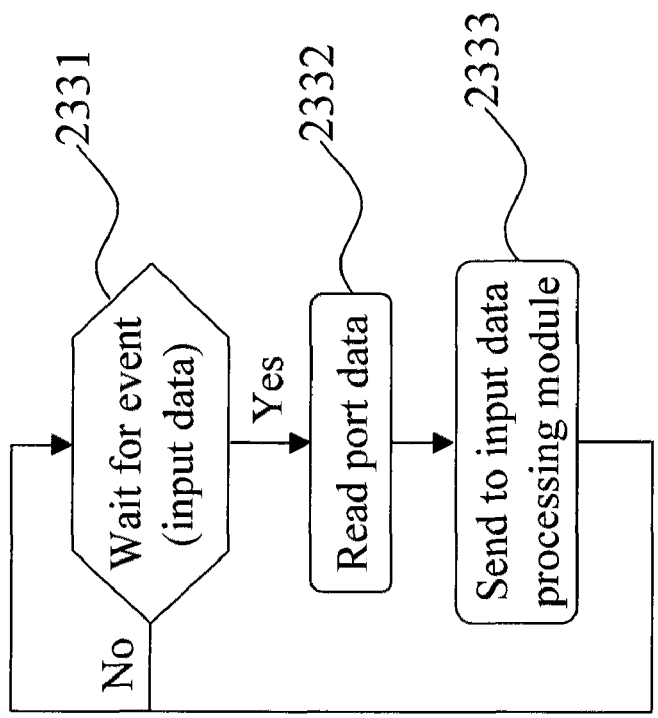
FIG. 10 is a block diagram that further extends the process of the user input data reception module according to the above preferred embodiment of the present invention.

As shown in FIG. 10, the user input data reception module 233, as shown in FIG. 7, further comprises three modules: a synchronous module 2331, a port data reading module 2332, and a communication module 2333 among the other processing threads in the system such as data processing module. The synchronous module 2331 is designed to wait for an event that shows that a new position data is ready without wasting the processing time of the system processor unit 12 as shown in FIG. 2 to search the port continuously.

Figure 11:
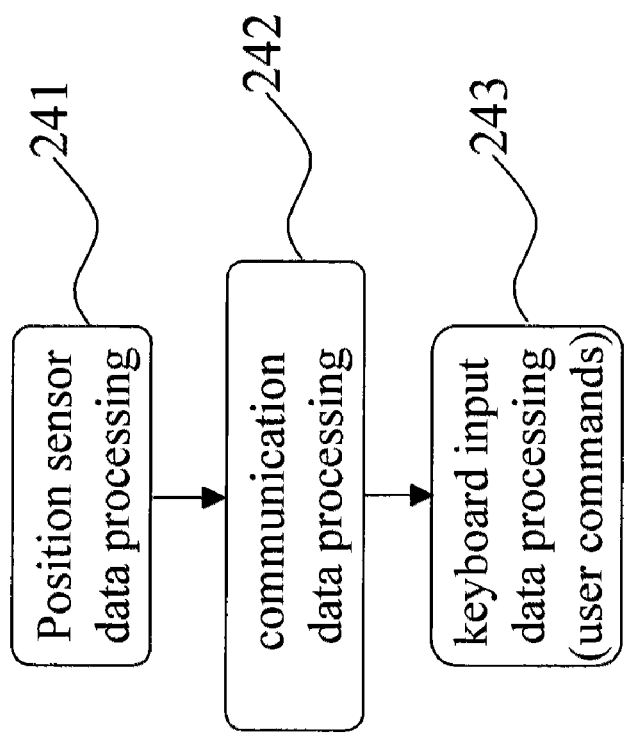
FIG. 11 is a block diagram that further details the process of the data processing module according to the above preferred embodiment of the present invention.

As shown in FIG. 11, the data processing module 74, as shown in FIG. 3, further comprises three modules: a position sensor data processing module 241, a communication data processing module 242, and a user input data processing module 243.

Figure 12:
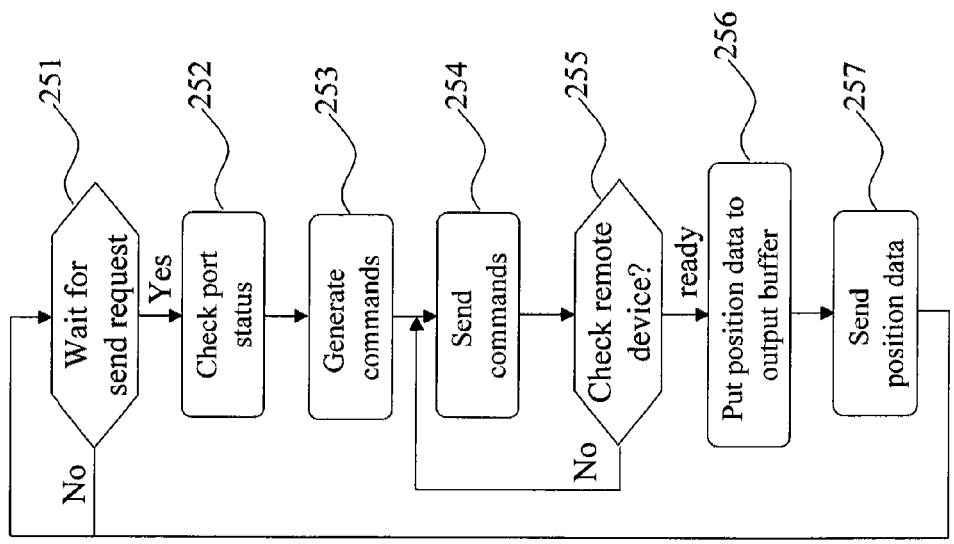
FIG. 12 is a block diagram that further details the process of the data transmission module according to the above preferred embodiment of the present invention.

As shown in FIG. 12, the data transmission module 75, as shown in FIG. 3, further comprises a synchronous sending request module 251, a communication port status checking module 252, a communication command generation module 253, a communication command sending module 254, a remote device checking module 255, a synchronous module 256 to write the data to be sent to the output data buffer, and a data sending module 257.

The portable multi-tracking system provides life and property security functionality. The user can send messages including the carrier's location to the other multiple tracked carriers and the emergency center or user service provider simultaneously. So that when an emergency happens, the other multiple tracked carriers can help to send the messages to the emergency center or user service for the carrier that encountered an emergency. Message categories can include accidents, vehicle problems, robberies, kidnappings, etc. This application can be very broad and covers old people, children, handicapped people, airplanes, boats, nature exploration, hunting and fishing, etc.

When the portable multi-tracking system is installed in a vehicle and detects various situations, it can automatically (without human intervention) send an alarm message including the vehicle's location to the other multiple tracked carriers, emergency center or user service provider. Such situations include cases where the vehicle is hit by unidentified sources, the vehicle's window is broken, or the vehicle is towed due to improper parking. The portable multi-tracking system cooperates with the car door anti-theft system. When a thief opens the car door, the portable multi-tracking system sends the vehicle location and emergency message to the other multiple tracked carriers, the emergency center or user service provider. The portable multi-tracking system also triggers a sound alarm to intimidate the thieves.

The emergency center or user service provider can command the portable multi-tracking system to interrupt the fuel supply, and continuously transmit the vehicle's location to the emergency center when it receives a stolen vehicle message from the vehicle.

When the driver loses a car key, after identifying the driver's ID, the user service provider can command the portable multi-tracking system to unlock the car door and start the engine for the driver. When the driver leaves the car without locking the car door, the multi-tracking unit can report to the user service provider. The user service provider can then command the multi-tracking unit to lock the car door for the driver.

The user service provider can monitor several vehicles and coordinate their movement to desired locations on the basis of criteria such as minimum time dispatching or ability to execute desired tasks. The user service provider can monitor the travel status of a vehicle and accordingly inform a waiting station as to the vehicle's anticipated arrival time. Such a capability of the system is useful for various services such as ambulances, taxis, fire trucks, police, security services, guards, etc. The user service provider can also monitor the vehicle's mileage, gas status, coolant, battery, and tire pressure via the portable multi-tracking system. The user service provider also provides vehicle maintenance and repair services.

The portable multi-tracking system is a fully functional cell phone. The user can dial and pick up the phone without a handset by using voice control. The voice-controlled dial function can be set up for multiple telephone numbers.

The portable multi-tracking system detects actuating signals and response properly. The actuating signals are triggered by pushing an emergency button, vehicle maintenance sensors, and sensors for detecting accident, unauthorized unlocking door of the vehicle, unauthorized driving of the vehicle, and violent breaking of windows of the vehicle.

Figure 13:
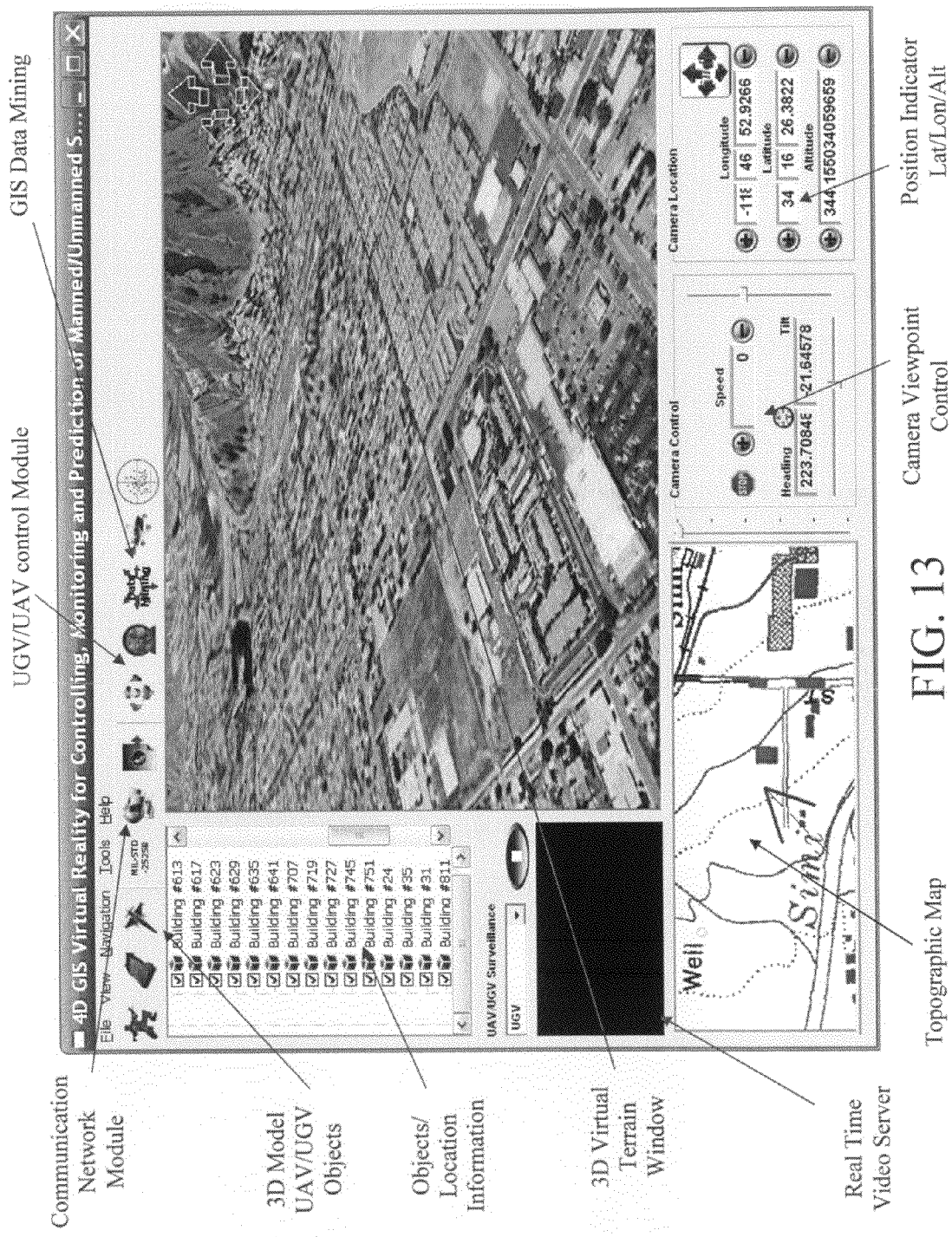
FIG. 13 is an interface diagram of a 4-Dimensional (4D) Geographic Information System (GIS) Virtual Reality for Controlling, Monitoring and Prediction of Manned/Unmanned Systems according to the above preferred embodiment of the present invention.

The above invention has resulted in a system of a 4-Dimensional (4D) Geographic Information System (GIS) Virtual Reality for Controlling, Monitoring and Prediction of Manned/Unmanned Systems as shown in FIG. 13. It provides the user with a GIS based, three dimensional virtual/augmented reality interfaces for controlling, monitoring and prediction of manned/unmanned systems.

The system features are:

IP-Based Network Communication
Ethernet based communication system for logistic and location information exchange between the 4D GIS nodes and the manned/unmanned vehicles. Real time video server enhancing situational awareness.

Logistic Planning and Task Assignments
Automated task assignments, route planning for various mission scenario.

Asset/Environment Monitoring and Management
Real time tracking and monitoring of vehicle assets and mission status. Multi-layer database with efficient data fusion algorithms that identify attributes associated with vehicles asset, tasks requirements, GIS terrain and obstacles.

Predicative Data Mining
Based on established database and various pattern features, identify possible bottlenecks, and failures before status reaches urgent. Handle different events with various priorities in a queuing system.

System Applications
  Ground Sea, and Air Freight Services
    Real-time tracking and monitoring of vehicles globally, shipment routing/re-routing, shipment time estimation, routing center status, weather conditions, emergency information.
  Emergency Responder
    Coordination and tracking of various emergency response agencies, fire trucks, police vehicles, paramedics, other personnel.
  Network Centric System
    Network centric coordination, mission planning for surveillance, remote weapon system, multi-UAV/UGV task assignments.

In other words, the proposed system will provide a seamless human-robot system and interface based on the coremicro 4D-GIS virtual/augmented reality for controlling, monitoring, and prediction of multi-manned/unmanned systems.

Figure 14:
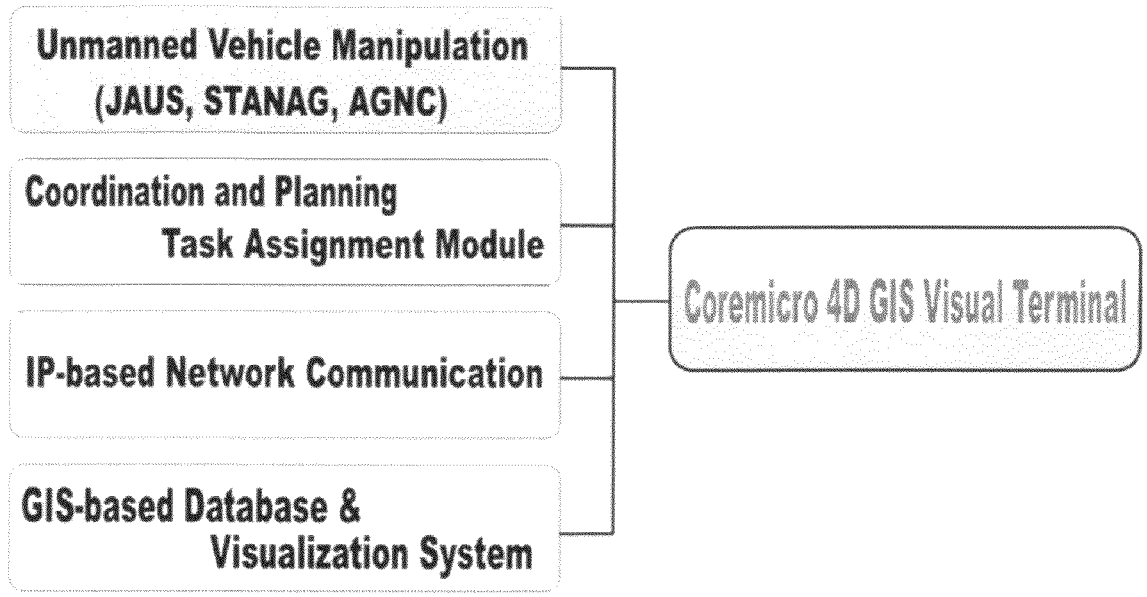
FIG. 14 is a first schematic diagram of a 4-Dimensional (4D) Geographic Information System (GIS) Virtual Reality for Controlling, Monitoring and Prediction of Manned/Unmanned Systems according to the above preferred embodiment of the present invention.
Figure 15:
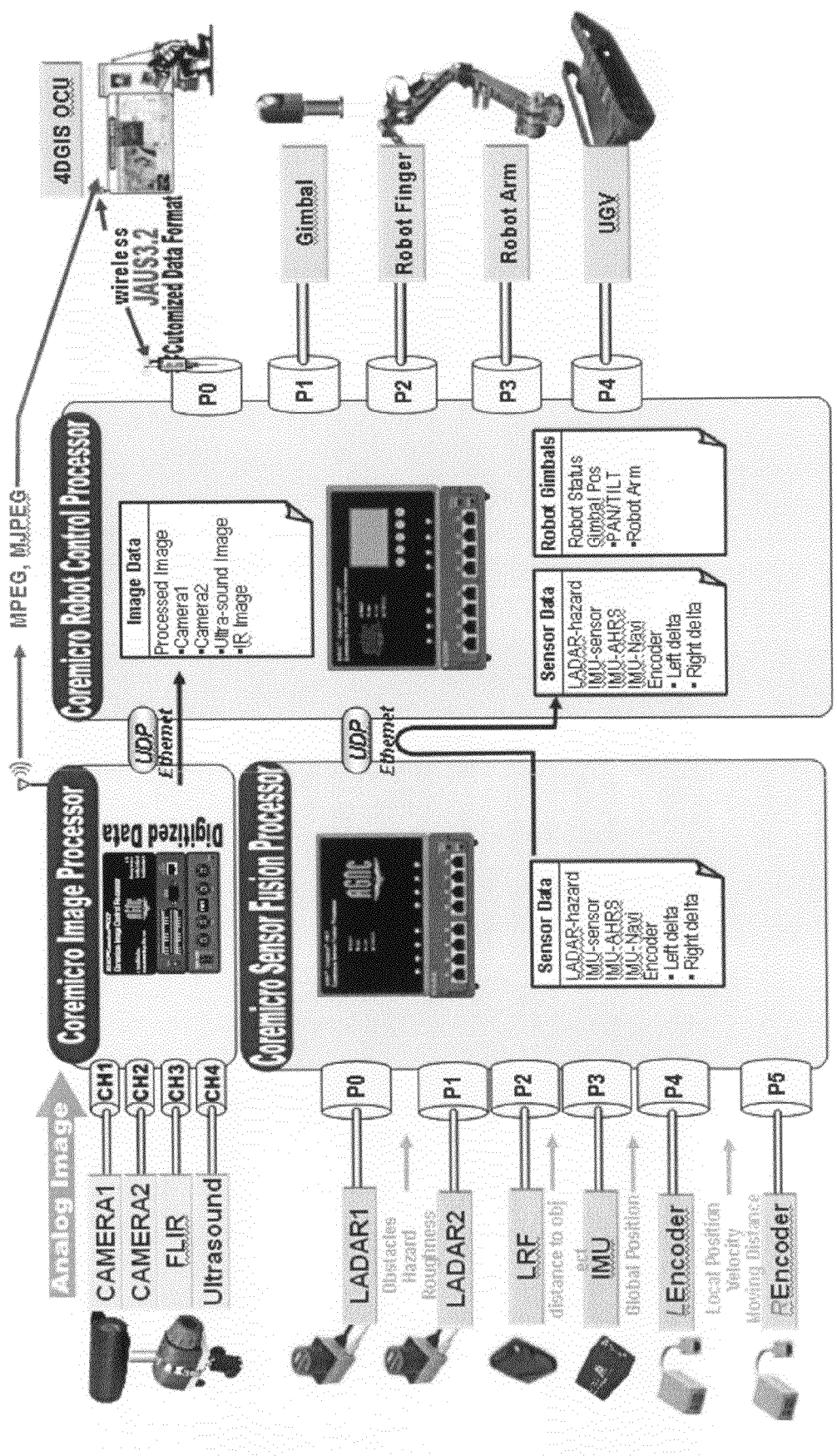
FIG. 15 is a second schematic diagram of a 4-Dimensional (4D) Geographic Information System (GIS) Virtual Reality for Controlling, Monitoring and Prediction of Manned/Unmanned Systems according to the above preferred embodiment of the present invention.

As shown in FIGS. 13-15 of the drawings, the Human-Robot Interaction (HRI) system features four key enabling subsystems:
  Subsystem 1: Multiple robots Operator control system for both Autonomous and Tele-Operational Modes of operation.
  Subsystem 2: Distributed Autonomous and semi-autonomous task and resource allocation system for mission planning and collaboration among multiple human-robot teams.
  Subsystem 3: RF communication System enabling control and information exchange between robots and operator control systems as well as the coordination and collaboration among the various operator control systems.
  Subsystem 4: The GIS-based database system includes geospatial, terrain modeling (DEM), resource geo-location/tracking, real-time video services, navigation information (map, landmarks, sensors), task and mission information.

The front-end of the 4D GIS Virtual/Augmented Reality Interface System is a display and interaction technology which overlays online video captures from in situ robots, 3D virtual objects, robot position and speed, planned trajectories, task status and other pertinent and task critical information onto the 3-D virtual terrain. The 3-D rendering engine provides an easy to use 3D camera navigation control for zooming and flying around the area of interest. The human-robot collaborative mission for the space exploration is one of the coremicro 4D GIS HRI system applications. The geo-referenced, higher resolution video capture from the robots is draped onto the virtual terrain to provide the remote astronaut a clear view of craters and bumps around the robots not shown in the lower resolution virtual terrain. The combination of downloaded video on 3D virtual terrain and task information and trajectory path in the form of 3D virtual objects provide the astronaut a heightened sense of the spatial environment the robots or other team members are working in. Whether the astronaut is on the Lunar surface, in orbit, or even on earth, the 4D GIS virtual/augmented communication, tracking, command and control system will allow seamless operation/co-operation with the robots and other team members as though they are working side by side on the Lunar surface.

The unmanned vehicle Manipulation module provides standardized communication protocols such as JAUS and STANAG and predetermined customized protocols for accessing and controlling multiple unmanned vehicles, sensors, manipulators. Each robotic assets/sensors is mapped into the unmanned vehicle control user interface. Currently, the operator can manipulate/control any robotic vehicle that is either JAUS or STANAG compatible through joystick/mouse/keyboard. For the EVA scenario, the control interface can be converted to a voice activated system whereas; the movement and waypoint destination can be commanded by the astronaut's voice. The task assignment module utilizes the dynamic mixed integer linear programming (MILP) and genetic algorithms (GA) to coordinate tasks among various robotics assets/resources, minimizing time, effort and fuel spent and optimize performance within various time and environmental (path, obstacles, failures) constraints. The current radio frequency communication interface module utilizes the standard TCP/IP models. The communication provides transmission of all control messaging, environment and visual sensors data, tasking and mission information. The communication network physical layer can be easily replaced with a satellite based network or future space IP communication system. The GIS-based database and visualization system enables the 3D virtual/augmented reality display of all pertinent data. The user can select any mission data for display on or drape over the 3D DEM terrain with either 3D models or standardized icons or user-selected symbols and graphics. The xml-based database includes a global digital elevation model (DEM) from the Mars Orbiter Laser Altimeter (MOLA) for the Mars surface and the Clementine for the Lunar terrain, local topographical maps, real-time video on terrain services, mission plans, tasks, waypoints, robotic assets, landmarks and other mission information based on customization.

The primary key component is the innovative navigation sensor which constitutes an interruption-free navigation and tracking system, carried by an astronaut or robotic vehicle. In the planetary environment, no magnetic heading is used and gravity and temperature are quite different. The IMU mathematical model should be different and more accurate. The mathematical model can be adjusted by various constant factors and also needs NASA's models related to planetary considerations. With the data, encoder and IMU, position can be calculated, referenced to some specific point, such as the base station. The Coremicro Navigator is designed to be flexible, with variable parameters which are compensated with encoders. It uses "Dead Reckoning". Dead reckoning accumulates an error that needs to be compensated. The compensation method for dead reckoning in the planetary environment is accomplished by using the Long Distance Laser Range Finder (LRF). The LRF can also be used for on-site calibration to overcome the error despite pre-launch calibration.

The Robot Control System with distributed processors is shown in FIG. 15. The system consists of two major parts. One is the operator's terminal as a user interface to recognize all changes in the environment and vehicle status. The other is a vehicle controller which has three processors: Coremicro Image Processor, Coremicro Sensor Fusion Processor and Coremicro Robot Control Processor. The structure is designed as a distributed processor scheme which can be reconfigured according to objectives and strategy. Each processor can play a separate role because the vehicle control system is distributed and separately reconfigurable. FIG. 15 is a block diagram of the Coremicro Robot, depicting the Navigation, Guidance and Control relationship between different system components are:

On-board mission control computer—performs intensive data processing for robot autonomous navigation and guidance, communication control, path planning, waypoint control, and multiple sensor data fusion. It is also the controller of the robot motors and the mechanical system.

(1) Coremicro Palm Navigator 3—for autonomous, self-contained, precision positioning, guidance, control and navigation.

(2) RF data links—for data collection, remote control, and TV (imagery) based guidance.

(3) Camera for monitoring and navigation.

(4) LADAR sensors (Laser Detection and Ranging)—utilizing LADAR to identify objects. Unlike video data, LADAR sensors provide three-dimensional information. The LADAR determines the position of objects, prevents collisions, and monitors open driving spaces.

(5) Radar sensors—using both forward and backward looking RADAR for vehicle driving and collision avoidance. This will allow the robotic vehicle to move in both directions even if normal visibility is poor. The Radar odometer is used for vehicle control and navigation aiding.

The user friendly 4D Virtual/Augmented Reality human-robot interface suitable for planetary exploration applications as well as the communication and control algorithms within the interface are enhanced by this invention. Visualization system is also enhanced to provide end-to-end communication, tracking, command and control of multiple robots and astronauts. The video on terrain feature superimposes the high resolution, real-time video feed from the robots onto the virtual terrains generated from either the Mars Orbiter Laser Altimeter (MOLA) for the Mar surface or the Clementine for the Lunar terrain. The overlay of virtual terrain with high resolution video combined with 3D LIDAR object recognition enables a seamless teleoperation or monitoring of autonomous operation of the robots.

The key features of the Coremicro 4D-GIS virtual/augmented reality system are as follows:

(1) Refreshing layer content from a spatial database or file to display the latest updates of information without going through the Load process.

(2) Reloading layer content from a spatial database around a new location.

(3) Re-projecting loaded spatial layers from their native projection to the current terrain projection.

(4) Displaying geographic information for objects, such as length, area, and perimeter.

(5) Loading and displaying tabular information for objects loaded from Shape, ArcSDE, and Oracle Spatial.

(6) Exporting polygon, line, and point objects to a Shape file.

(7) Support for OpenFlight reference file.

(8) Loading terrain feature layers with absolute height.

(9) Support video on terrain and cartographic symbols library.

(10) Creation of extensions to add support for additional file and database formats.

(11) Real-time movement of objects for command and control applications.

(12) Addition of custom-made objects (e.g., danger zone dome).

(13) Advanced terrain queries (e.g., terrain profile).

(14) Combination of advanced map displays.

(15) Combination of HTML pages with advanced functionality.

(16) Creation of custom run-time applications, embedding the 3D and information windows as ActiveX components.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable multi-tracking system, comprising:

a system processor;

a positioning unit, which is connected to said system processor, providing current host position data of said portable multi-tracking system, wherein said position data contains GPS signal and IMU position information allowing to compensate said GPS signal in areas where GPS signal is not available and includes position, velocity, and heading of said portable multi-tracking system;

a storage device, which is connected to said system processor, storing an electronic map database and other interim data including said host position data and a host identification, wherein map data is capable of being retrieved by said system processor from said electronic map database of said storage device;

a wireless communication module, which is connected with said system processor, for receiving client position data and client identifications of other client portable multi-tracking systems which are linked with said portable multi-tracking system through a public wireless internet, and sending said host position data and said host identification through said public wireless internet to said other client portable multi-tracking systems, so as to provide said portable multi-tracking system with client position data of said other client portable multi-tracking system, and to provide said other client portable multi-tracking systems with said host position data of said portable multi-tracking system;

a display device, which is connected to said system processor, for displaying said map data in form of a map, wherein said map data is retrieved by said system processor from said storage device, moreover said host position data and said client position data are processed in said system processor to form a current host location and client locations respectively, which are overlayingly displayed on said map displayed on said display device; and a 4D GIS virtual reality interface system supporting and enhancing situation awareness of said portable multi-tracking system, comprising:

a plurality of robot operator control interface modules adapted for both autonomous and tele-operational modes of operation and arranged for communicating with a plurality of robots corresponding to said plurality of robot operator interface modules;

a distributed autonomous and semi-autonomous task planning and resource allocation interface module adapted for mission planning and collaboration among multiple human-robot users;

a radio frequency communication interface module adapted for enabling control and information exchange between said robot and multiple robot operator control interface modules and facilitating coordination and collaboration among said robot operator control interface modules; and a GIS-based database system which includes a geospatial and terrain modeling system, a resource geo-location/tracking system, a real-time video services system, a navigation information database, and a task and mission information database, each communicating with and providing data to said 4D GIS virtual reality interface system.

2. The portable multi-tracking system, as recited in claim 1, each of the robots is embodied as an unmanned vehicle and each said robot operator control interface module is embodied as an unmanned vehicle manipulation module adapted for providing standardized communication protocols and predetermined customized protocols for accessing and controlling multiple unmanned vehicles, sensors, manipulators.

3. The portable multi-tracking system, as recited in claim 2, wherein said radio frequency communication interface module is pre-programmed to utilize standard TCP/IP model, and provides transmission for all control messaging, environment and visual sensors data, tasking and mission information.

4. The portable multi-tracking system, as recited in claim 3, wherein said GIS-based database system contains information for identify possible bottlenecks, and failures before status reaches urgent.

5. The portable multi-tracking system, as recited in claim 4, wherein said GIS-based database system has a plurality of vehicle assets which includes a real time tracking and monitoring feature, and has a multi-layer database structure with an optimal data fusion algorithms that identify attributes associated with said vehicles asset, tasks requirements, GIS terrain and obstacles.

6. The portable multi-tracking system, as recited in claim 5, wherein said robot operator control interface modules are communicated through Ethernet based communication system for logistic and location information exchange with real time video server for enhancing situational awareness.

7. The portable multi-tracking system, as recited in claim 6, wherein said a GIS-based database system is adapted for automated task assignments and route planning for a wide range of mission scenarios.

8. The portable multi-tracking system, as recited in claim 2, wherein said GIS-based database system contains information for identify possible bottlenecks, and failures before status reaches urgent.

9. The portable multi-tracking system, as recited in claim 8, wherein said GIS-based database system has a real time tracking and monitoring feature of vehicle assets, and has a multi-layer database structure with an optimal data fusion algorithms that identify attributes associated with said vehicles asset, tasks requirements, GIS terrain and obstacles.

10. The portable multi-tracking system, as recited in claim 9, wherein said robot operator control interface modules are communicated through Ethernet based communication system for logistic and location information exchange with real time video server for enhancing situational awareness.

11. The portable multi-tracking system, as recited in claim 10, wherein said a GIS-based database system is adapted for automated task assignments and route planning for a wide range of mission scenarios.

12. The portable multi-tracking system, as recited in claim 1, wherein said radio frequency communication interface module is pre-programmed to utilize standard TCP/IP model, and provides transmission for all control messaging, environment and visual sensors data, tasking and mission information.

13. The portable multi-tracking system, as recited in claim 12, wherein said GIS-based database system contains information for identify possible bottlenecks, and failures before status reaches urgent.

14. The portable multi-tracking system, as recited in claim 13, wherein said GIS-based database system has a plurality of vehicle assets which includes a real time tracking and monitoring feature, and has a multi-layer database structure with an optimal data fusion algorithms that identify attributes associated with said vehicles asset, tasks requirements, GIS terrain and obstacles.

15. The portable multi-tracking system, as recited in claim 14, wherein said robot operator control interface modules are communicated through Ethernet based communication system for logistic and location information exchange with real time video server for enhancing situational awareness.

16. The portable multi-tracking system, as recited in claim 15, wherein said a GIS-based database system is adapted for automated task assignments and route planning for a wide range of mission scenarios.

17. The portable multi-tracking system, as recited in claim 1, wherein said GIS-based database system contains information for identify possible bottlenecks, and failures before status reaches urgent.

18. The portable multi-tracking system, as recited in claim 17, wherein said GIS-based database system has a real time tracking and monitoring feature of vehicle assets, and has a multi-layer database structure with an optimal data fusion algorithms that identify attributes associated with said vehicles asset, tasks requirements, GIS terrain and obstacles.

19. The portable multi-tracking system, as recited in claim 18, wherein said robot operator control interface modules are communicated through Ethernet based communication system for logistic and location information exchange with real time video server for enhancing situational awareness.

20. The portable multi-tracking system, as recited in claim 19, wherein said a GIS-based database system is adapted for automated task assignments and route planning for a wide range of mission scenarios.

* * * * *